March 6, 1962 — A. M. YOCOM — 3,023,858
BRAKE COOLING AND STABILIZING MEANS
Filed Sept. 10, 1958 — 4 Sheets-Sheet 1

INVENTOR
ALVIN M. YOCOM
BY Gustave Miller
ATTORNEY

INVENTOR
ALVIN M. YOCOM
BY Gustave Miller
ATTORNEY

March 6, 1962     A. M. YOCOM     3,023,858
BRAKE COOLING AND STABILIZING MEANS
Filed Sept. 10, 1958     4 Sheets-Sheet 3
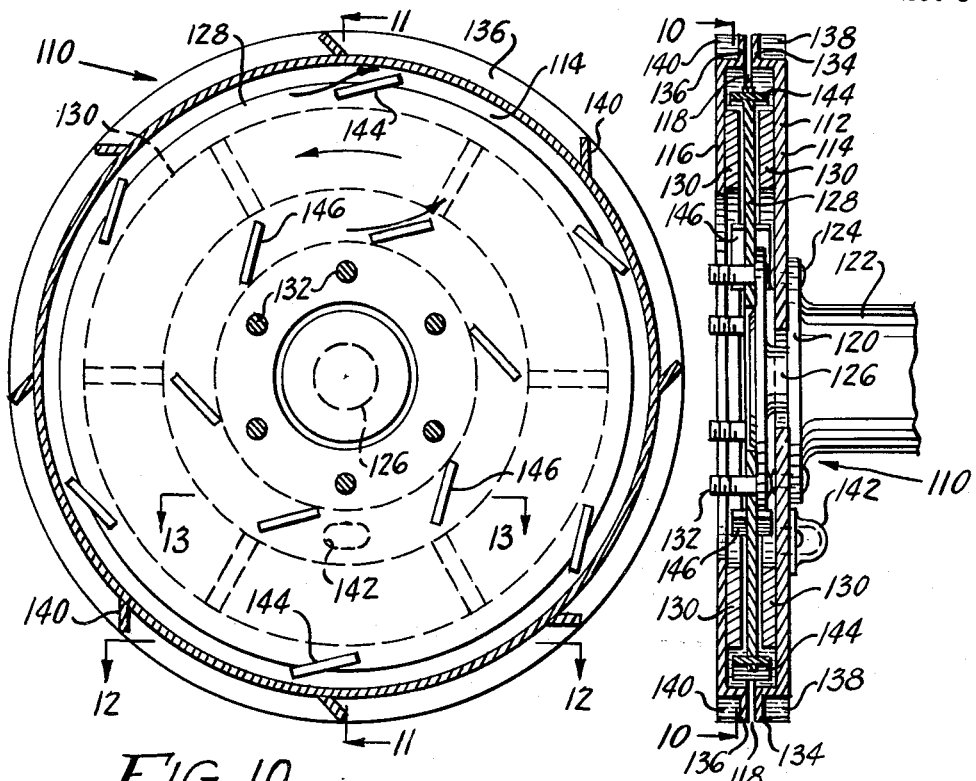
FIG. 10
FIG. 11
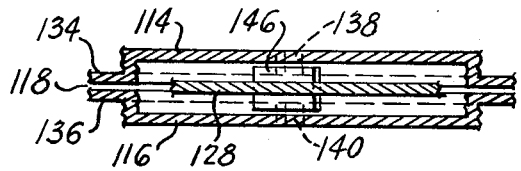
FIG. 12
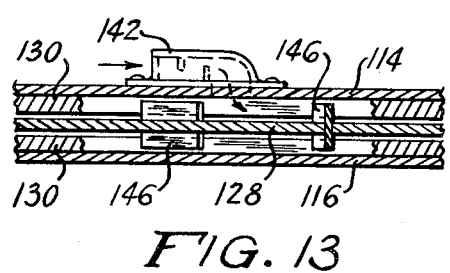
FIG. 13
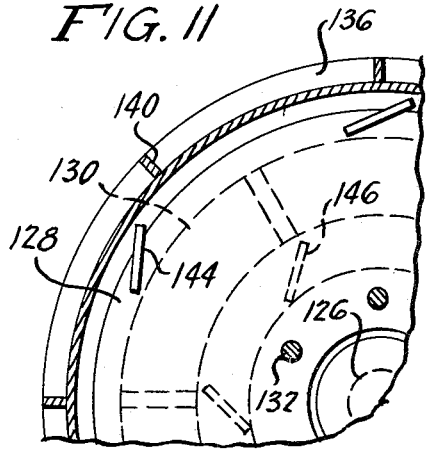
FIG. 14
INVENTOR
ALVIN M. YOCOM
BY *Gustave Miller*
ATTORNEY March 6, 1962 A. M. YOCOM 3,023,858
BRAKE COOLING AND STABILIZING MEANS
Filed Sept. 10, 1958 4 Sheets-Sheet 4

INVENTOR
ALVIN M. YOCOM
BY Justan Miller
ATTORNEY

United States Patent Office 3,023,858
Patented Mar. 6, 1962

3,023,858
BRAKE COOLING AND STABILIZING MEANS
Alvin M. Yocom, 182 Colorado Ave.,
Highland Park, Mich.
Filed Sept. 10, 1958, Ser. No. 760,175
1 Claim. (Cl. 188—264)

This invention relates to brakes such as are used on automotive vehicles and the like, and it particularly relates to means for cooling such brakes in a highly effective manner.

The problem of adequately stabilizing and cooling the brakes of an automobile or other such vehicle, or of various other types of machinery such as tractors, aircraft, stamping machines or any other apparatus employing friction brakes, has long been recognized as a problem. In addition, various other problems have arisen. For example, the problem of outside road dirt which has a tendency to adhere and collect between the brake shoe and brake drum and which results in scoring of the drum. Another problem is the collection of moisture. This moisture between the brake shoe lining and the drum increases the frictional contact between the shoe lining and the drum and is a large factor in brake grab. Even when there is no real collection of water as such, the humidity of the atmosphere greately increases brake effectiveness, causing what is known as "damp grab." These factors plus the uneven expansions and contractions due to uneven cooling cut down on the effectiveness and life of the brakes. Furthermore, where hydraulic brakes are used, it is almost essential that temperatures be kept substantially constant so that there is no unequal expansion and conraction in the hydraulic cylinders, pistons, brake fluids, etc.

It is one object of the present invention to overcome the above problems in an effective and simple manner.

Another object of the present invention is to provide means for overcoming the above problems, which means can be easily applied to all types of existent brake means.

Other objects of the present invention are to provide an improved cooling and conditioning means for maintaining temperature conditions in a brake assembly, of the character described, that is easily and economica'ly produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 10 is a front elevational view of a third type of brake means equipped with a third form of means embodying the present invention, and taken on line 10—10 of FIG. 11.

FIG. 11 is a sectional view taken on line 11—11 of FIG. 10.

FIG. 12 is a sectional view on line 12—12 of FIG. 10.

FIG. 13 is a sectional view on line 13—13 of FIG. 10.

FIG. 14 is an enlarged fragmentary view of a portion of the device shown in FIG. 10.

Figure 1:
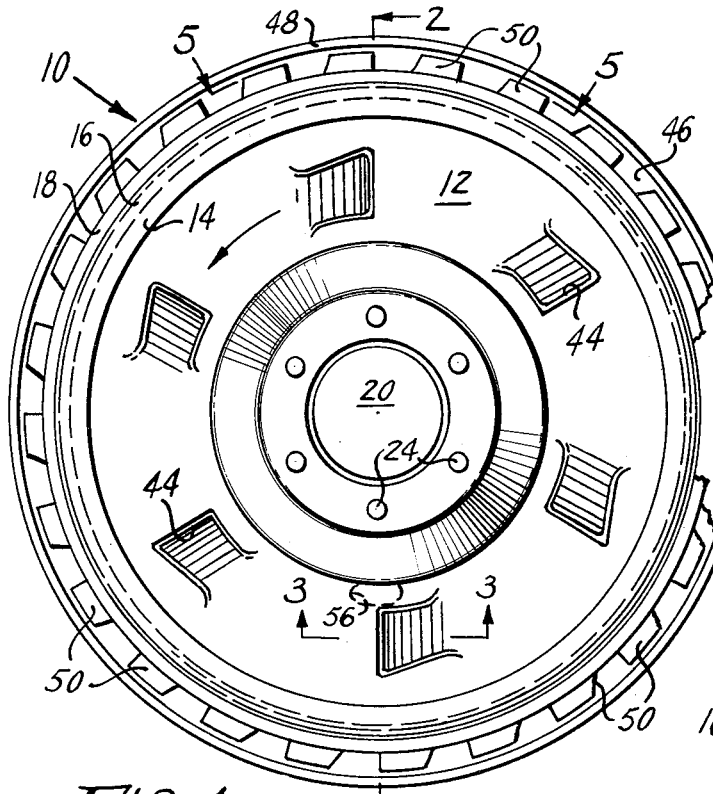
FIG. 1 is a front elevational view of a brake device equipped with means embodying the present invention.

Referring in greater detail to the drawings wherein similar reference characters refer to similar parts, there is shown in FIGS. 1 to 5 a brake drum 10 comprising a dished, plate-like support element 12 the peripheral edge of which is fixedly engaged in an annular channel in a flange 14 of the annular drum housing 16. This drum housing 16 is provided with a series of ribs or fins 18 coaxially arranged on the external surface of the housing.

The element 12 is secured, at its dished portion, to the flange 20 of a wheel axle 22 by means of bolts 24 adapted to receive the usual securing nuts. This axle 22 extends through the hollow center of the housing 16 and through a central aperture 26 of a drum cover 28. The drum cover 28 is connected to a flange 30 on an axle housing 32 by bolts 34 and nuts 36.

Within the drum housing 16 are movable brake shoes 38 of the ordinary type, which are movably connected to drum cover 28 by pins 40 supporting torsion springs 42. This brake shoe arrangement is of generally standard construction.

Figure 3:
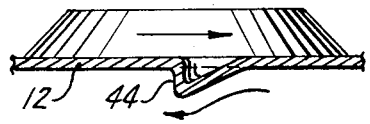
FIG. 3 is a sectional view on line 3—3 of FIG. 1.

In order to provide cooling air streams, the dished, disc-like, plate element 12 is provided with an annularly-spaced series of vanes 44 around the dished central portion of plate 12. These vanes 44 are formed either by coating, if the plate 12 is made of cast metal, or by indenting, if it is made of sheet metal. As best shown in FIG. 3, the vanes 44 extend inwardly at an angle; the vane thereby forming inwardly-extending baffles. This shape of the vanes 44 provides for both a lateral and radial, as well as a circumferential flow of air within the drum housing 16.

Figure 2:
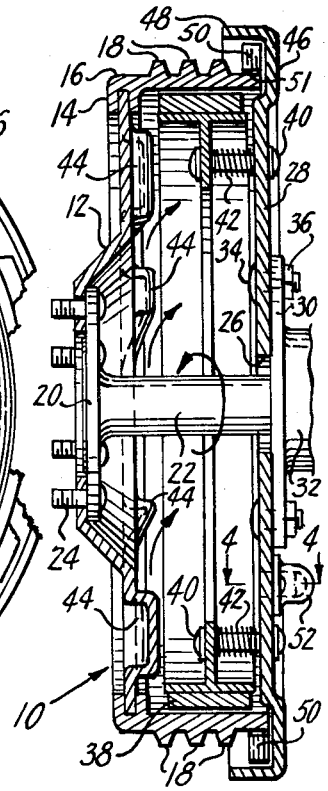
FIG. 2 is a sectional view on line 2—2 of FIG. 1.
Figure 5:
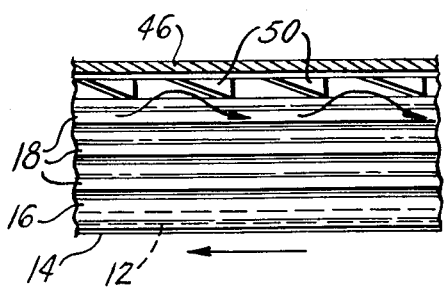
FIG. 5 is a view, partly in section and partly in elevation, taken on line 5—5 of FIG. 1.
Figure 4:
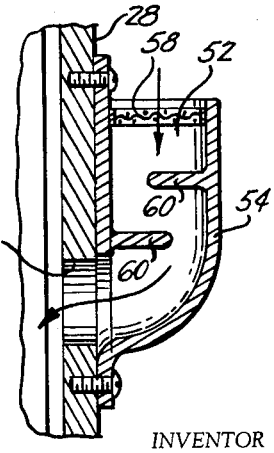
FIG. 4 is a sectional view on line 4—4 of FIG. 2.
Figure 6:
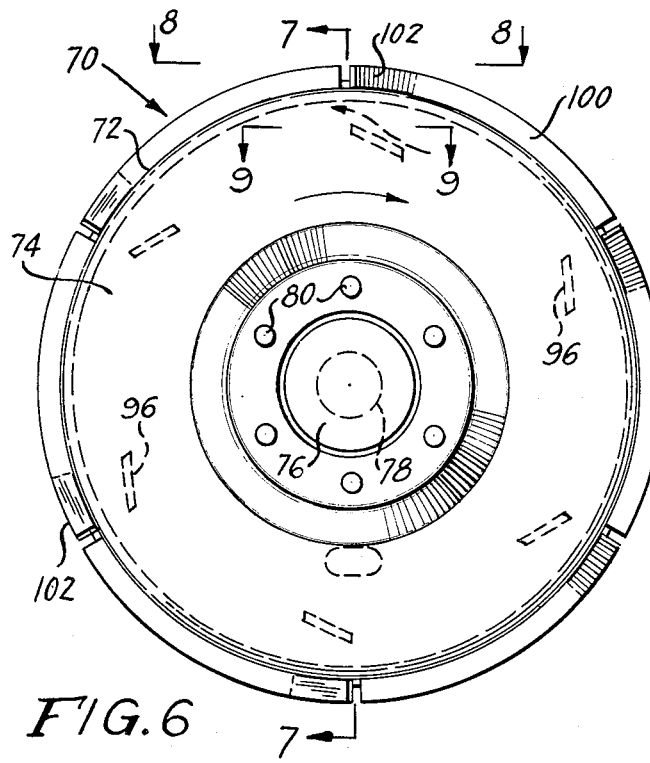
FIG. 6 is a front elevational view of a second type of brake device equipped with another form of means embodying the present invention.
Figure 7:
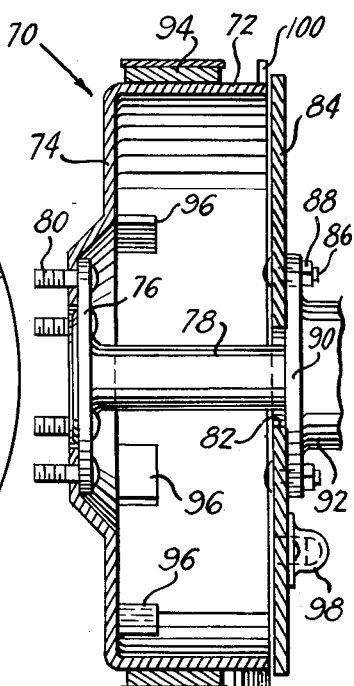
FIG. 7 is a sectional view on line 7—7 of FIG. 6.

The drum cover 28 is provided with an outwardly-offset peripheral portion 46 which is spaced from the inner edge of the drum housing 16 (as best shown in FIG. 2) and is provided with a lateral flange 48. The flange 48 is spaced from the ends of a series of vanes 50 extending out from an enlarged rib 51 on the edge of the drum housing 16. These vanes 50 are preferably skewed (as best shown in FIG. 5) in order to direct any air flowing thereover both in a lateral and radial direction.

The drum cover 28 is also provided with air inlets 52. These inlets 52 are annularly spaced around the axle housing 32 and each inlet comprises a duct 54 extending radially at an angle of about 30° from an aperture 56 in the cover 28. The inlet ends of the ducts 54 are open but covered by screens 58.

Between the screened inlet end of the duct 54 and the corresponding aperture 56 in the cover 28 there are provided a pair of oppositely-positioned, spaced baffles 60. By this construction, air enters through the screen 58, where it is cleaned of dirt, stones and other debris, and is passed, at increased velocity, by means of the baffles 60, through the aperture 56 into the interior of drum housing 16. Here, the air is caught up by the rotating scoop vanes 44 and passed between the shoes 38 and the inner surface of the drum housing 16, through the space between the rib 51 and the offset portion 46, and over the vanes 50. The vanes 50 direct the air in a cooling path over the ribbed outer surface of the drum housing 16.

In FIGS. 6 to 9, there is shown a modified brake device wherein the brake shoes are on the exterior of the drum. In this device, generally designated 70, there is provided a drum housing 72 connected to a centrally dished support plate 74 to which is connected the flange 76 of axle 78. Bolts 80 and nuts (not shown) secure the plate 74 to flange 76.

The axle 78 extends through a central aperture 82 in a drum cover 84 which is secured by bolts 86 and nuts 88 to a flange 90 on an axle housing 92.

The brake drum housing 72 has its frictional brake surface on the exterior thereof and this surface is engageable by external brake shoes 94. Otherwise, this construction is similar to that shown in FIGS. 1 to 5 in that plate 74 is provided with vanes 96 similar to vanes 44 and the cover 84 is provided with air inlets 98 similar to inlets 52.

Figure 8:
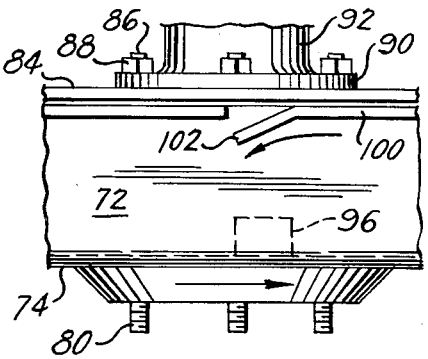
FIG. 8 is a top elevational view on line 8—8 of FIG. 6.
Figure 9:
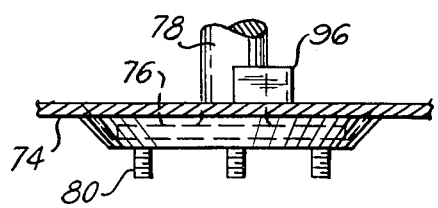
FIG. 9 is a sectional view taken on line 9—9 of FIG. 6.

The external periphery of the drum housing 72 is provided with a rib 100 around its inner edge adjacent the cover 84 but spaced from the cover 84 as is also the edge of the drum housing 72 itself. The rib 10 is interrupted at spaced intervals by offset vane portions 102 extending at lateral angles across a portion of the peripheral surface of the drum housing 72 (as best shown in FIG. 8).

In this form of the device, the air enters through inlets 98, is caught by vanes 96, projected out through the space between the edge of the drum housing 72 and cover 84, flows over rib 100 and is directed by vanes 102 laterally over the outer surface of drum housing 72 between this outer surface and the brake shoes 94.

In FIGS. 10 to 14 there is shown a disc brake assembly generally designated 110 which comprises a housing 112 including two sections 114 and 116 separated by an annular slot 118. The section 114 is secured to a flange 120 of an axle housing 122 by bolts 124. The axle housing 122 surrounds an axle 126 connected to a rotatable centrally-apertured disc 128 set between frictional brake shoes 130. The disc 128 is provided with securing bolts 132.

The sections 114 and 116 of housing 112 are provided on their outer peripheries with radially extending ribs 134 and 136. These ribs 134 and 136 are positioned on the inner edges of sections 114 and 116 adjacent the slot 118 and are each provided with intersecting circumferentially-spaced lateral vanes 138 and 140 respectively; these vanes being angularly inclined.

The section 114 is provided with air inlets 142 similar to inlet 52 while the disc 128 is provided with inclined vanes 144 on its periphery and with inclined vanes 146 adjacent its inner periphery.

In operation, as the disc 128 rotates, the vanes 146 scoop up the air flowing through inlets 142 and project it to its outer periphery between the disc 128 and the brake shoes 130. As it passes between the disc 128 and shoes 130, its velocity is increased and it acts to both cool the adjacent surfaces and blow off dust, dirt, stones and the like. Then, the air is scooped up by vanes 144 and projected through slot 118 against ribs 134 and 136. The air is then caused to flow over the vanes 138 and 140 to cool the housing.

Figure 15:
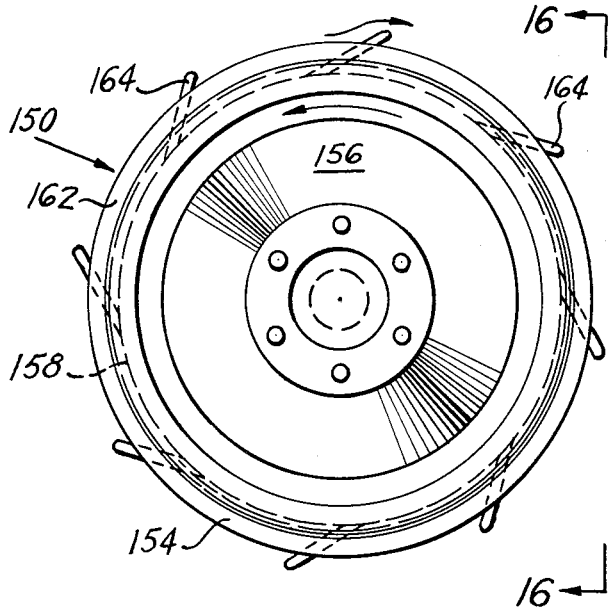
FIG. 15 is a front elevational view of a brake means equipped with yet another form of the means embodying the present invention.
Figure 16:
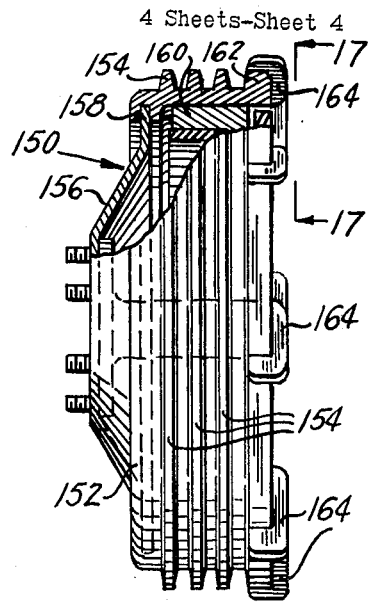
FIG. 16 is a view, partly in section and partly in elevation, taken on line 16—16 of FIG. 15.
Figure 17:
FIG. 17 is a fragmentary view taken on line 17—17 of FIG. 16.

In FIGS. 15 to 17 there is shown a brake drum, generally designated 150. This drum 150 is similar in many ways to the drum of FIGS. 1 to 5 in that it comprises a cylindrical drum housing 152 having cooling fins or ribs 154 on its external surface and having a dished plate 156 fixedly seated at its periphery within a groove 158 in the drum housing 152.

The drum 150, similarly to the drum of FIGS. 1 to 5, has an internal braking surface adapted to be engaged by brake shoes 160. The drum housing 152 also has an enlarged rib 162 at the open side thereof. On this rib 162 are provided a series of circumferentially-spaced vanes 164 extending at an inclined angle to the periphery of the drum. These vanes 164 serve substantially the same purpose as vanes 50.

Although this invention has been described in considerable detail, such description is intended as being illustrative rather than limiting, since the invention may be variously embodied, and the scope of the invention is to be determined as claimed.

Having set forth and disclosed the nature of this invention, what is claimed is:

A brake stabilizing assembly comprising an axle, a brake drum coaxial with said axle, said drum comprising a cylindrical drum housing with one open end and a mounting plate closing the other end, said mounting plate having a dished central portion connected to said axle for rotation therewith, a series of annularly-spaced vanes on said mounting plate around the axis thereof, said vanes being inclined radially and inwardly of said drum, brake shoes movable toward and away from a brake surface on the periphery of said drum, and a drum cover substantially closing the open end of said drum, said drum cover being stationary relative to said drum, a series of annularly spaced air inlets on said drum cover, an air cleaning duct secured to said cover over each said inlet, said duct comprising a flat base plate portion secured in flat contact with said cover over said inlet, said base plate portion having an aperture mating with said air inlet in said cover, and a hood portion fixed on said base plate portion about said aperture, said duct having an entrance opening between said base plate portion and said hood portion, a filter screen fixed in said entrance opening, baffle plate means extending alternately and oppositely from said hood portion and said base plate portion into the path between said duct opening and said base plate portion aperture providing a tortuous air passage therebetween, said inlets and said vanes being so arranged relative to each other that air flowing through said inlets is directed at increased velocity between said brake shoes and said brake surface on said drum, and passage means between said drum and said cover for directing said air out of the interior of said drum and against a series of circumferentially-spaced vanes on the exterior of said drum, said last-mentioned vanes directing said air over the outer periphery of said drum.

References Cited in the file of this patent

UNITED STATES PATENTS

| 1,966,169 | Forbes | July 10, 1934 |
| 2,042,750 | Van Halteren | June 2, 1936 |
| 2,105,176 | Ash | Jan. 11, 1938 |
| 2,181,008 | Bonzack | Nov. 21, 1939 |
| 2,248,684 | Levy | July 8, 1941 |
| 2,331,259 | Whitten | Oct. 5, 1943 |
| 2,425,116 | Musselman | Aug. 5, 1947 |
| 2,549,217 | Mason | Apr. 17, 1951 |
| 2,642,959 | Freer | June 23, 1953 |
| 2,646,862 | Dodge | July 28, 1953 |
| 2,781,873 | Goepfrich | Feb. 19, 1957 |

FOREIGN PATENTS

| 795,548 | France | Jan. 8, 1936 |
| 1,123,522 | France | June 11, 1956 |
| 912,423 | Germany | May 28, 1954 |
| 520,510 | Great Britain | Apr. 25, 1940 |

OTHER REFERENCES

Autocar Publication, Fighting Friction Heat, August 7, 1936 (pages 254, 255, 256).